(12) United States Patent
Onuma (10) Patent No.: US 7,812,975 B2
(45) Date of Patent: Oct. 12, 2010

(54) PRESCANNING IN IMAGE PRINTING/READING APPARATUS

(75) Inventor: Maki Onuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1045 days.

(21) Appl. No.: 10/536,749

(22) PCT Filed: Nov. 26, 2003

(86) PCT No.: PCT/JP03/15093

§ 371 (c)(1), (2), (4) Date: May 27, 2005

(87) PCT Pub. No.: WO2004/051979

PCT Pub. Date: Jun. 17, 2004

(65) Prior Publication Data

US 2006/0087701 A1    Apr. 27, 2006

(30) Foreign Application Priority Data

Dec. 2, 2002    (JP) ............................. 2002-350239

(51) Int. Cl.
*G06F 15/00*    (2006.01)

(52) U.S. Cl. ................. 358/1.12; 358/1.5; 358/1.9; 358/2.1; 358/1.18; 358/406; 358/461; 358/504; 382/274

(58) Field of Classification Search ............... 358/1.5, 358/1.9, 1.12, 1.18, 461, 2.1, 406, 504; 382/274
See application file for complete search history.

(56) References Cited

U.S. PATENT DOCUMENTS

| | | | | |
|---|---|---|---|---|
| 5,412,490 A | * | 5/1995 | Kojima et al. | 358/473 |
| 5,528,788 A | * | 6/1996 | Yamamoto et al. | 15/77 |
| 5,833,381 A | * | 11/1998 | Kellogg et al. | 400/624 |
| 6,081,687 A | * | 6/2000 | Munemori et al. | 399/374 |
| 6,185,405 B1 | * | 2/2001 | Sueoka | 399/367 |
| 6,286,830 B1 | * | 9/2001 | Kitahara et al. | 271/223 |
| 6,771,397 B2 | * | 8/2004 | Hashizume | 358/474 |
| 6,975,435 B1 | * | 12/2005 | Maitani et al. | 358/475 |

FOREIGN PATENT DOCUMENTS

| | | |
|---|---|---|
| EP | 0 837 593 | 4/1998 |
| JP | 8-139850 | 5/1996 |
| JP | 10-136161 | 5/1998 |
| JP | 11-187212 | 7/1999 |

* cited by examiner

*Primary Examiner*—Edward L Coles
*Assistant Examiner*—Mark R Milia
(74) *Attorney, Agent, or Firm*—Fitzpatrick, Cella, Harper & Scinto (57) ABSTRACT

An image printing/reading apparatus in which a reference white board for prescanning can be prevented from being soiled with ink, and the influence of stray light from a paper discharge port can be reduced. A commonality of a print sheet path for conveyance of print sheet and a document path for conveyance of document is at least partially realized as a common path. A reading unit is provided with a reference white board for shading correction used upon execution of prescanning. Upon execution of document reading, the reading unit and the reference white board are moved to a document reading position. On the other hand, upon execution of prescanning, the reading unit and the reference white board are moved to a retreat position where the influence of ambient light is reduced. Further, upon printing, the reading unit and the reference white board are also moved to the retreat position for preventing the reference white board from being soiled with ink.

8 Claims, 9 Drawing Sheets

PRESCANNING IN IMAGE PRINTING/READING APPARATUS

TECHNICAL FIELD

The present invention relates to a digital image printing/reading apparatus, and more particularly, to an image printing/reading apparatus having an ink-jet image printing unit.

BACKGROUND ART

Figure 9:
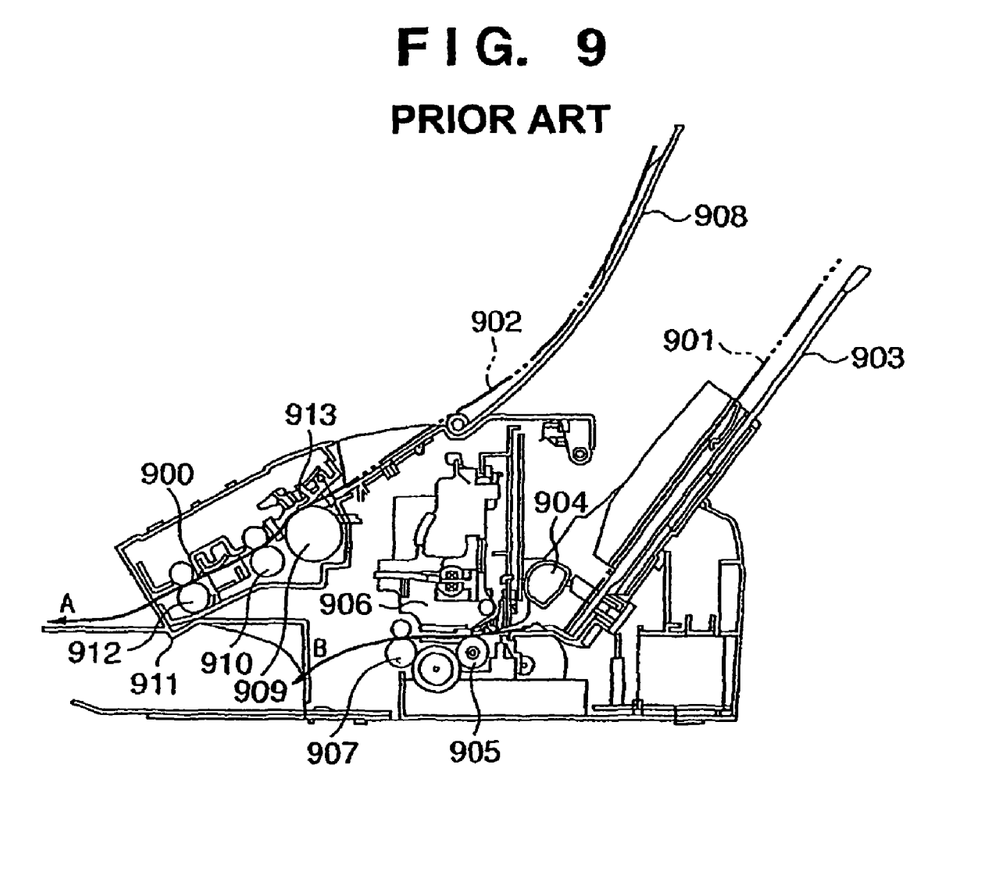
FIG. 9 is a cross sectional view of the 2-path type apparatus as the related art of the present invention.

First, related art of the present invention will be described. FIG. 9 is a cross sectional view of a facsimile apparatus using an ink-jet printing method. A print sheet 901 is placed on a print-sheet holder 903, and fed into the apparatus by a paper feed roller 904 and a separation mechanism (not shown) by one sheet. The fed print sheet 901 is conveyed by a conveyance roller 905 to a printing unit 906. The print sheet is discharged to the outside of the apparatus (in an arrow B direction) by a paper discharge roller 907 while image printing is performed on the print sheet by an ink-jet image printing mechanism.

On the other hand, a document 902 is placed on a document holder 908. At this time, the document 902 is set so as to abut on a wedge shaped portion formed with a document separation roller 909 and a separation piece 913. When the document separation roller 909 rotates in accordance with an image reading command, only one of plural documents 902 held with the wedge shaped portion which is in contact with the document separation roller 909 is separated by friction from the other documents 902 and conveyed. The separated and conveyed document 902 is further conveyed by a conveyance roller 910, then discharged to the outside of the apparatus (in an arrow A direction) by a paper discharge roller 912 while image information is read by a contact image sensor 911 or the like.

As the image quality of the document 902 is degraded with ambient light entered from a discharge port into the sensor 911, a light shielding sheet 900 is placed in slight contact with the document 902 for blocking the ambient light (stray light). Note that the contact between the light shielding sheet 900 and the document 902 is made such that the document 902 is not jammed in the apparatus.

Recently, there are increasing needs for downsizing and cost reduction of facsimile apparatuses. In studies to meet the requirements, it has been noted that in the above-described facsimile apparatus, a document conveyance mechanism and a print-sheet conveyance mechanism are separately provided.

That is, it has been considered that if the conveyance mechanism for conveyance of print sheet is also used as the conveyance mechanism for conveyance of document, the facsimile apparatus can be downsized. Since the conveyance roller, the paper discharge roller and the document driving motor and the like, provided for document conveyance can be omitted, this structure has seemed advantageous in downsizing and cost reduction.

However, this structure has problems. It is known that if an ink-jet method is used as the printing method, generally the discharge characteristic is more stable when ink is discharged right below in comparison with discharging in other directions. In this case, a print sheet is conveyed in a horizontal direction in a printing portion, since the print sheet is arranged in a direction orthogonal to the ink discharge direction. The image quality is improved if a document is read in a position as close to the conveyance roller as possible. Also, the image quality is improved if a print sheet is subjected to printing in a position as close to the conveyance roller as possible. In other words, to improve the image quality, it is preferable that a reading unit is positioned around the printing portion, and the reading unit is arranged in the horizontal direction.

In a case where the reading unit, which is an immobile but fixed unit, is positioned around the printing portion, a first problem is that a reference white board of the reading unit is soiled with ink upon printing.

For example, in facsimile apparatuses, generally a reference white board is read by prescanning for light amount control in the contact image sensor and acquisition of shading data. If the reference white board is soiled with ink in the prescanning, proper data cannot be obtained, and as a result, a read image is degraded.

Further, in some apparatuses, a movable reading unit is employed as disclosed in Japanese Published Unexamined Patent Application No. Hei 08-181820. However, as the reading unit is provided immediately below a printhead and driven upward/downward, if ink is erroneously discharged upon failure of conveyance of print sheet, the reference white board may be soiled with the discharged ink leaked through a platen board.

Further, a reading position of the above-described reading unit is in close vicinity to the paper discharge port of the document. As the ambient light (stray light) from the paper discharge port has a damaging effect on prescanning, a second problem is that a read image is degraded.

Further, as a third problem, if a paper jam with a document or print sheet occurs in the reading position, the document or print sheet disturbs a prescanning operation in the reading position.

DISCLOSURE OF THE INVENTION

The present invention provides an image printing/reading apparatus in which commonality of print sheet path and document path is realized at least in a part. A reading unit to read a document is movable between a first position to read a document and a second position to which the unit is retreated during standby time. Particularly, prescanning is performed by the reading unit in a position where the influence of stray light is reduced (for example, the second position).

Further, it may be arranged such that a reference white board for shading correction is provided in a position where it is not soiled with ink (for example, the second position). For example, in a case where the reference white board is moved with the reading unit, the reference white board is moved to the second position at least upon printing. Note that the reading unit and the reference white board may be moved to the second position during standby time.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will now be described in detail in accordance with the accompanying drawings.

The present embodiment provides an image printing/reading apparatus including: a printing unit to print an image on a print sheet conveyed through a print sheet path; a reading unit to read a document conveyed through a document path, having a common part belonging to the print sheet path and the document path; a reference white board for shading correction used by the reading unit upon execution of prescanning; a moving unit to move the reading unit and the reference white board to a document reading position when the reading unit executes document reading, on the other hand, to move the reading unit and the reference white board to a retreat position in which the influence of ambient light is prevented at least upon execution of prescanning; and a prescanning control unit to perform prescanning when the reading unit and the reference white board are in the retreat position.

Figure 1:
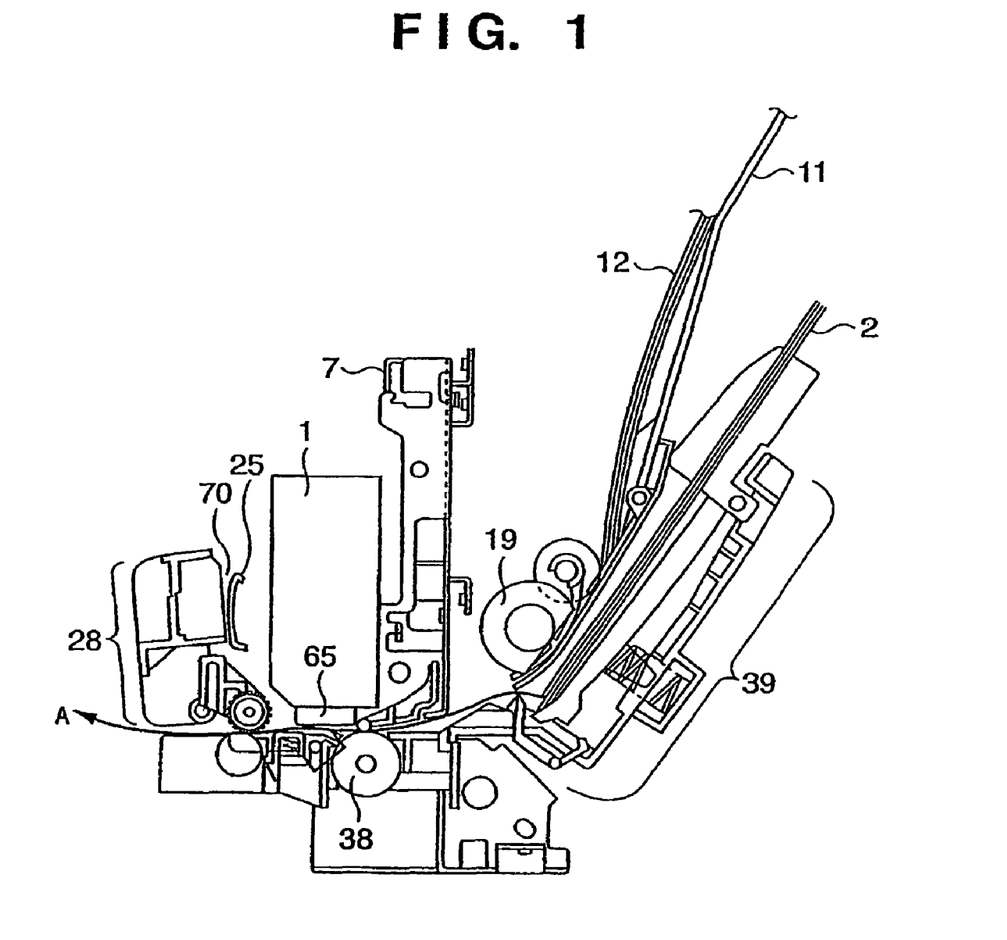
FIG. 1 is a cross sectional view of an image printing/reading apparatus according to a first embodiment of the present invention, particularly showing a status where a reading unit exists in a standby position (retreat position)
Figure 2:
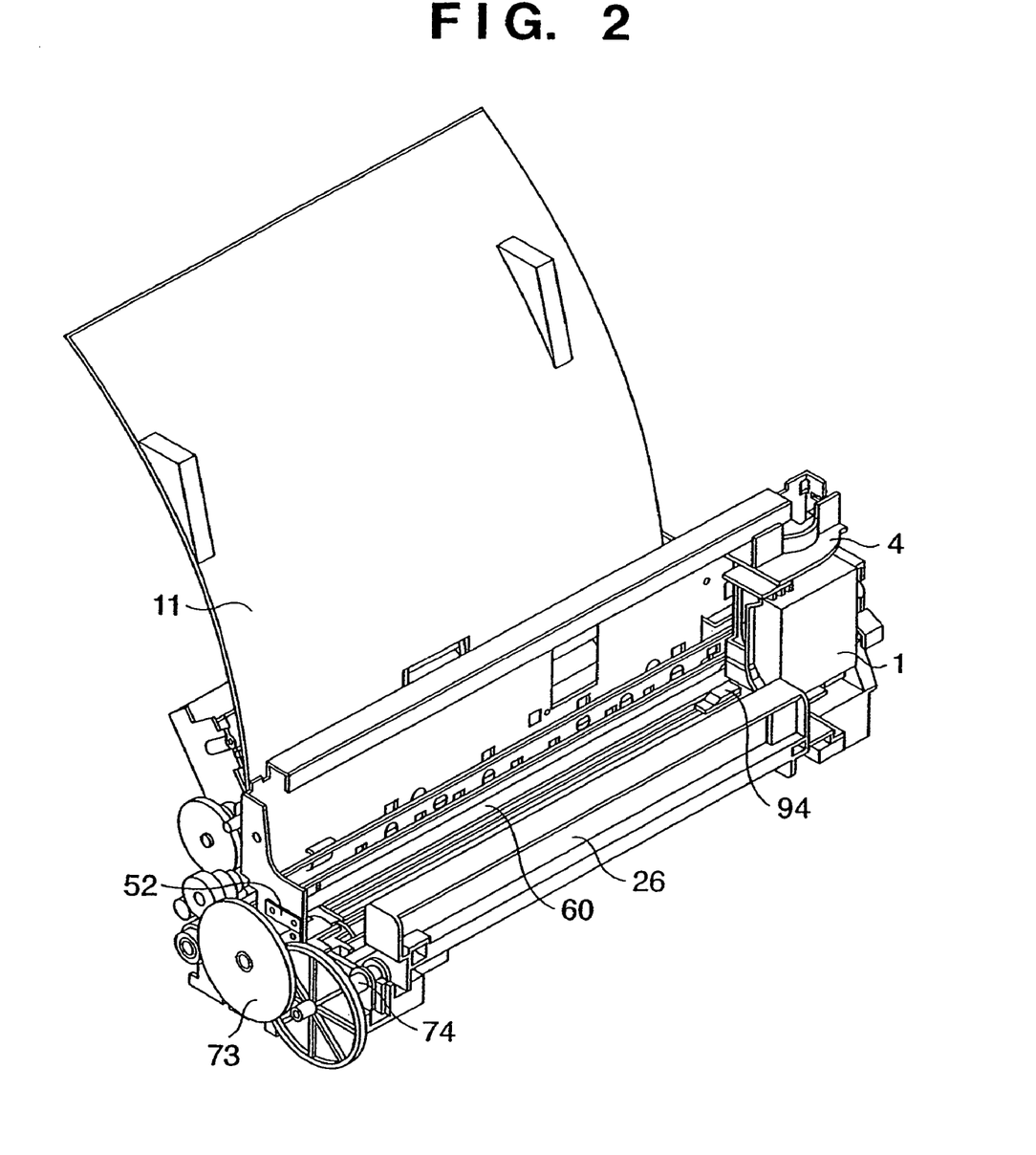
FIG. 2 is a perspective view of the image printing/reading apparatus in FIG. 1.

FIG. 1 is a cross sectional view of the image printing/reading apparatus according to the present embodiment, particularly showing a status where a reading unit 28 exists in a standby position (retreat position). FIG. 2 is a perspective view of the image printing/reading apparatus in FIG. 1. In the image printing/reading apparatus, a printing unit having a printing function of printing an image on a print sheet 2 as a print medium, and the reading unit 28 having a reading function of reading a document as a subject of reading, are provided approximately in the vicinity of a common path for conveyance of print sheet and document.

In FIG. 1, in the rear of the apparatus (right side of FIG. 1), a print-sheet feeding unit (ASF) 39 and a document feeding unit (ADF) 11 are provided. The print-sheet feeding unit 39 holds a stack of print sheets 2, and separates the print sheets one by one from the stack of the print sheets 2 and feeds them to a printing unit 38, in accordance with necessity. The document feeding unit (ADF) 11 holds documents 12, and separates the documents one by one and feeds them to the reading unit 28.

An ink tank and an ink head 65 are mounted on an ink cartridge 1. The ink cartridge 1 is removably attached to a carriage 4. The carriage 4 is guided by a guide shaft 60 supported with a guide rail 7 and both side plates of a chassis, and is supported movably in a print-sheet widthwise direction. Further, the carriage 4 is driven by a carriage motor. When image formation is not performed, as the ink cartridge 1 must be capped by a nozzle cap function, the cartridge is stopped at a right end within a carriage moving range.

Figure 3:
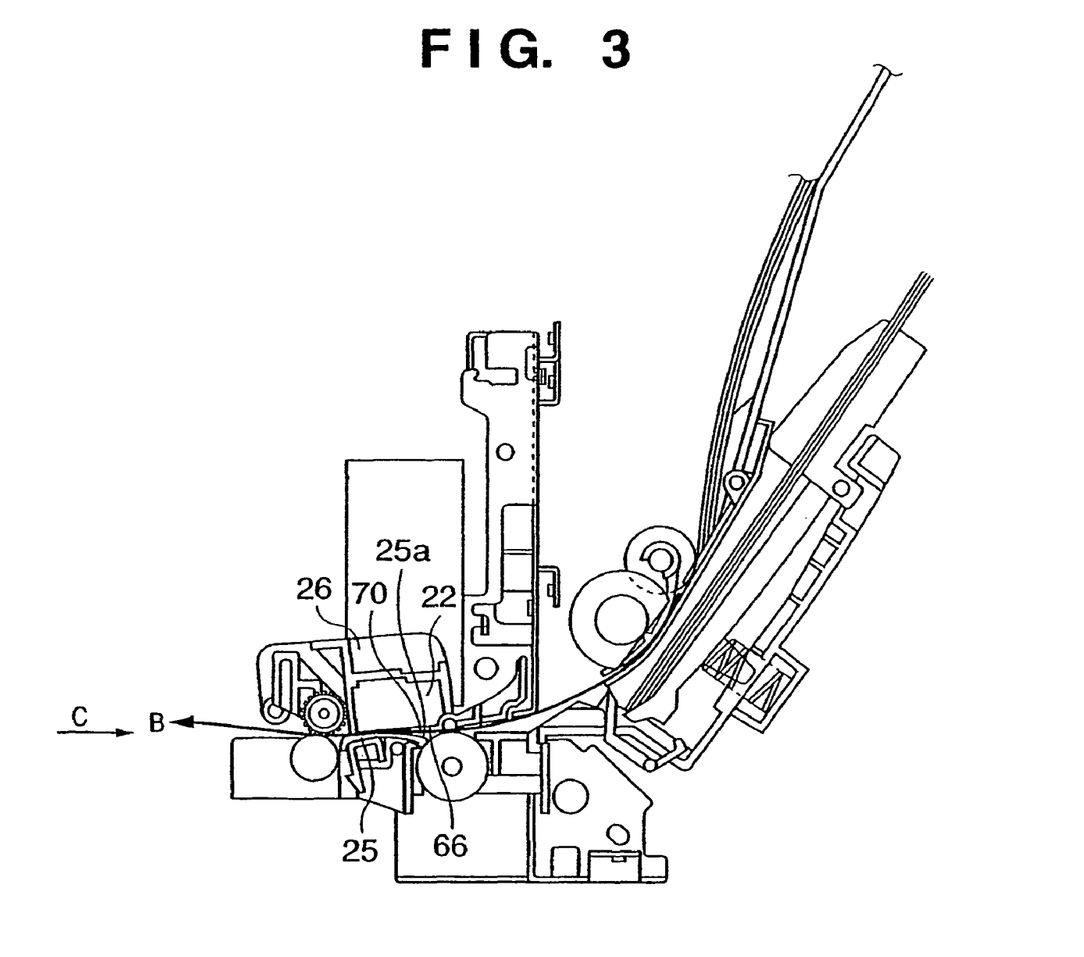
FIG. 3 is a cross sectional view of the image printing/reading apparatus upon reading operation.
Figure 4:
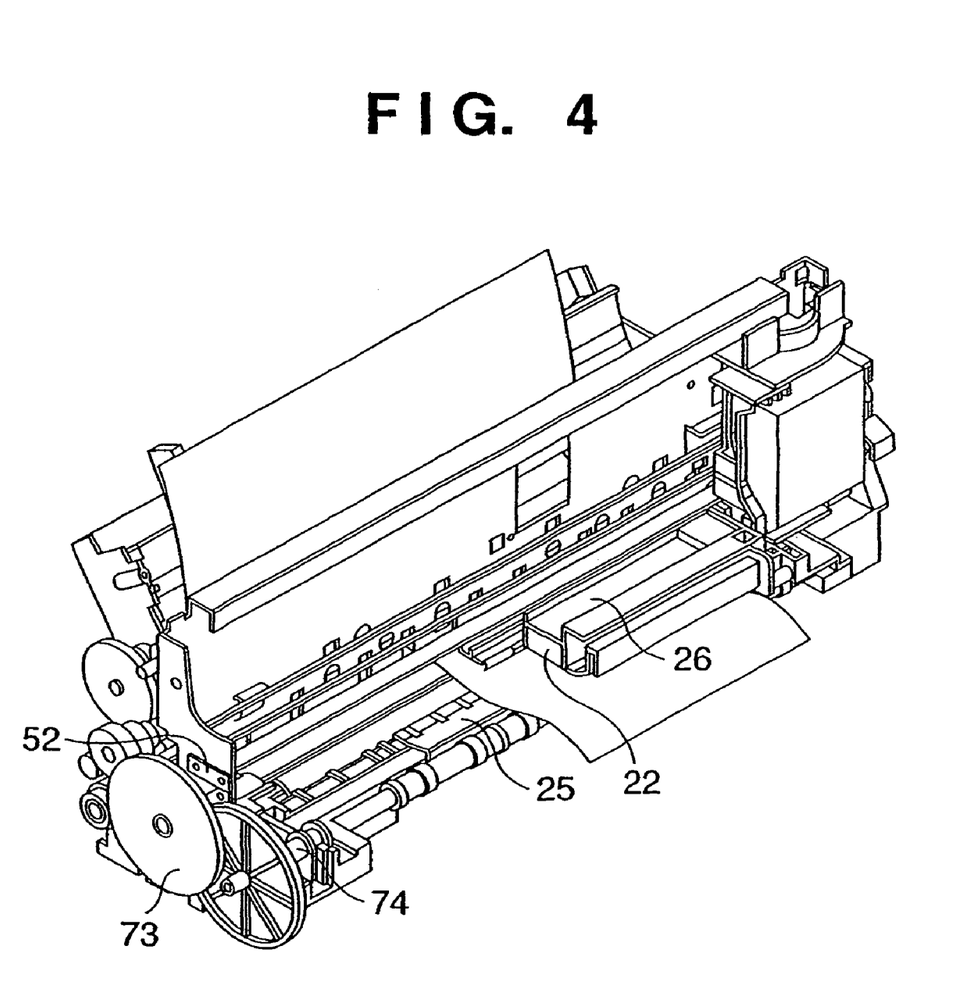
FIG. 4 is a perspective view of the image printing/reading apparatus upon reading operation.

FIG. 3 is a cross sectional view of the image printing/reading apparatus upon reading operation; and FIG. 4, a perspective view of the image printing/reading apparatus upon reading operation. The reading unit 28 includes a contact image sensor (CIS) 22, a CIS holder 26, and a reference white board 25. The CIS 22 is accommodated, with its sensor surface 66 facing outwardly, in a concave portion formed in the CIS holder 26 and screw-fixed there. The reference white board 25 is attached to the CIS holder 26. The reference white board 25 is formed by attaching a white sheet 25a to a metal plate. The metal plate has a flat surface to which the white sheet 25a is attached and a side plate formed by folding end portions in lengthwise direction. When the document 12 is read, the document 12 is guided to an entrance 70 formed between the CIS 22 and the white sheet 25a.

The CIS holder 26 is rotatable and movable between a first position (reading position) as shown in FIGS. 3 and 4 and a second position (standby position) as shown in FIGS. 1 and 2. Note that as the second position exists in a cover of the unit, the influence of stray light is prevented. Further, as the second position is higher than the ink head (ink discharge portion) 65, even if ink is discharged upon failure of conveyance of print sheet, the CIA 22 and the reference white board 25 can be prevented from being soiled with the discharged ink.

Next, the movement of the CIS holder 26 between the standby position and the reading position will be described in detail. As the CIS holder 26 is pressed by a torsion coil (not shown), it is held in the standby position as shown in FIGS. 1 and 2 at normal times. On the other hand, when a reading operation is requested, the carriage 4 moves to the left end, then drive selection means 52 is operated by using a cam member 94 attached to the carriage 4, and the driving force of the conveyance motor is transmitted to the reading unit 28. Further, when the conveyance motor is rotated in a normal direction, the driving force is transmitted via CIS drive transmission means 73 to CIS drive means 74, and the CIS holder 26 is moved from the standby position to the reading position. When the CIS holder 26 has moved to the reading position, a clutch coupling the CID drive means 74 to the CIS drive transmission means 73 is removed, and the CIS holder 26 is stopped in the position. Note that when the CIS holder 26 is moved from the reading position to the standby position, the conveyance motor is rotated in the reverse direction, and as a result, the CIS drive means 74 and the CIS drive transmission means 73 are coupled with the clutch, and the CIS holder 26 is returned to the standby position.

Figure 5:
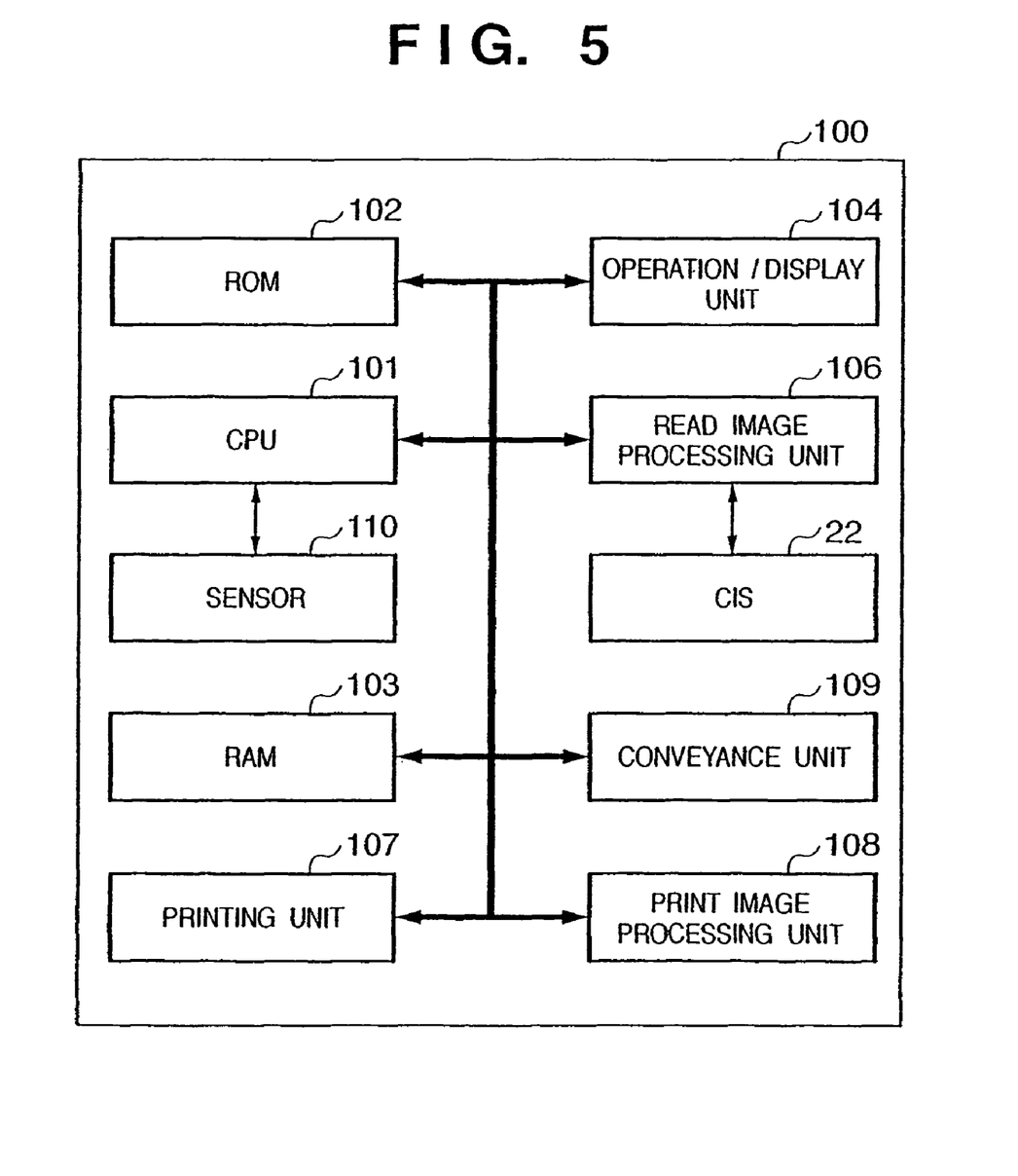
FIG. 5 is a block diagram showing a system configuration of the image printing/reading apparatus according to the first embodiment.

FIG. 5 is a block diagram showing a system configuration of the image printing/reading apparatus according to the present embodiment. A CPU 101 is a control unit to control the entire apparatus via a system bus.

A ROM 102 is a storage device in which program code such as an operation instruction group, operating system (OS) program code, initial value data, table data and the like are stored.

A RAM 103 is a storage device used as an image buffer, an image memory or the like, and also used as a buffer for temporarily storing image data transmitted/received by a facsimile function. Further, the RAM 103 is used as a memory for storing received image data as a file. The RAM 103 is protected with battery backup from an accident fault such as power outage.

An operation display unit 104 is provided with key switches including ten keys used upon dialing operation, data registration processing and function setting processing, function keys for using various functions, single-touch keys used for single-touch dialing registered telephone numbers, a start key used upon start of transmission, reception and copying, and a stop key used for stoppage of transmission, registration and setting, an LCD (liquid crystal display device) to display various messages for checkup of communication status, data registration, setting and the like, and a lamp turned on during communication and a lamp turned on upon occurrence of various errors (LEDs or the like). The status of the apparatus, the telephone number of the receiver of an originated call, time information, an operation procedure and the like are displayed on the operation display unit 104.

The contact image sensor (CIS) 22 converts an image optically read at a predetermined resolution into an electric image signal. Further, the contact image sensor 22 reads the reference white board 25 to obtain shading data.

An image processing unit 106 performs shading correction or the like on the signal from the CIS 22, and further performs image processing such as binarization processing, halftone processing and the like on the signal, and outputs high-definition image data. Further, the image processing unit 106 obtains the shading data from the data on the reference white board 25 read by the CIS 22.

A printing unit 107 has an ink jet cartridge, a motor to drive the cartridge and a drive controller to perform drive control.

An image processing unit 108 performs various image processings such as resolution conversion processing to convert image data in main-scanning resolution of 8 pel/mm to image data in main-scanning resolution of 360 dpi (dots per inch) for the printer, smoothing processing and density correction processing, thereby generates high-definition image data and outputs the data to the ink head 65.

A conveyance unit 109 has a paper conveyance motor to convey a document and a print sheet through a one-path conveyance channel as a common path belonging to a print sheet path and a document path, a paper conveyance controller to control the paper conveyance motor, and a sensor to detect statuses of the document and the print sheet. Further, the paper conveyance motor is also used as drive means by changing its driving direction for moving the CIS unit.

A sensor 110 includes a document detection (DS) sensor and a rear-end detection (PE) sensor. The DS sensor detects the existence/absence of document, and the PE sensor detects a paper rear end on the one-path conveyance line. For example, the CPU 101 determines whether or not a jam has occurred in accordance with the status of the sensor 110.

Figure 6:
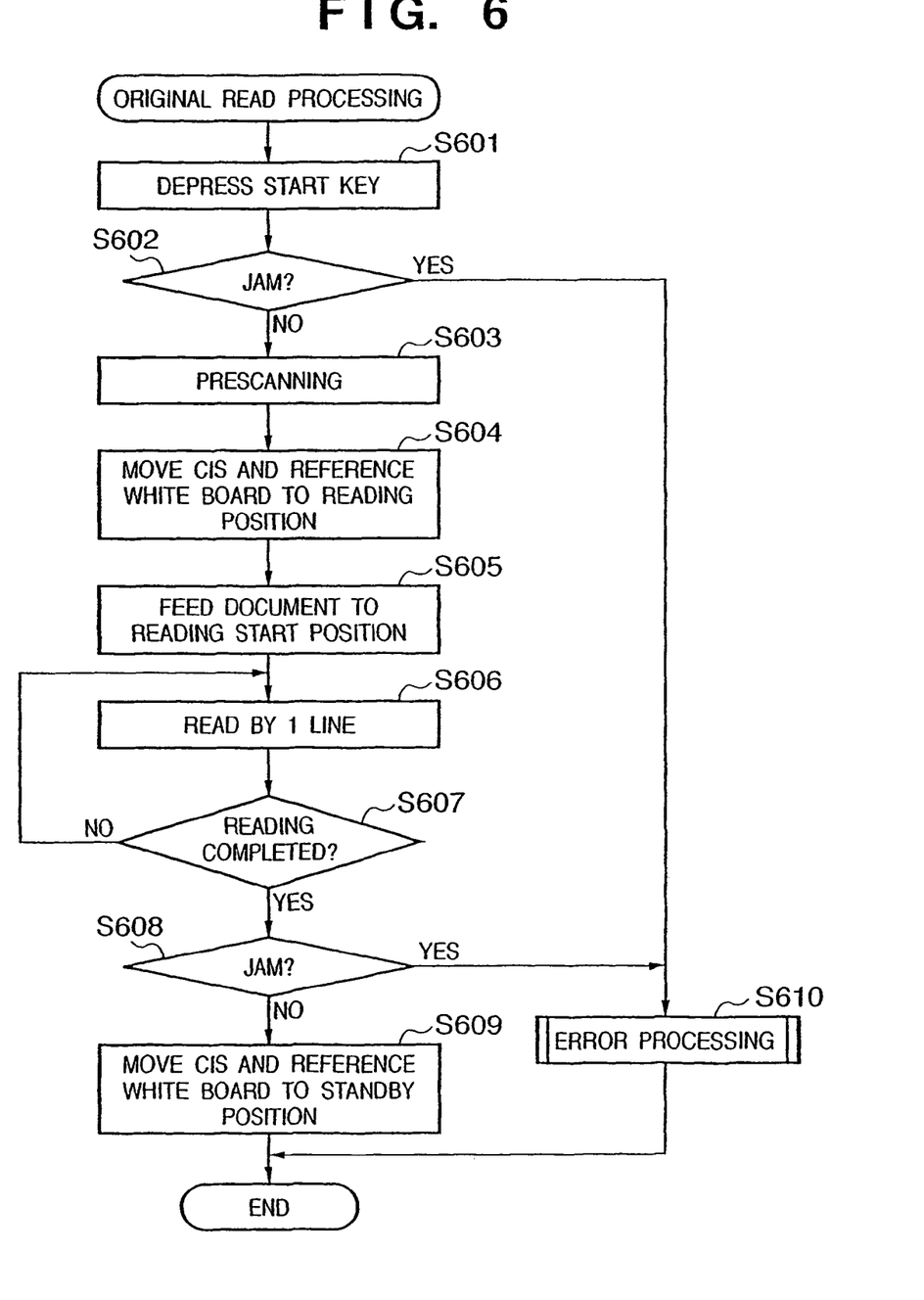
FIG. 6 is a flowchart showing reading operation processing according to the first embodiment.

FIG. 6 is a flowchart showing reading operation processing according to the present embodiment. In an initial status, the cartridge is in the home position, and the CIS 22 and the reference white board 25 are in the standby position.

At step S601, the CPU 101 detects that the start key on the operation display unit 104 has been depressed so as to start reading. Note that in the first embodiment, as jam detection is not performed, explanations of steps S602, S608 and S610 in FIG. 6 will be omitted.

At step S603, the CPU 101 performs prescanning operation. More particularly, the CPU 101 controls the CIS 22 in the standby position to read the reference white board 25, to obtain shading data and output the data into the image processing unit 108. Note that the CPU 101 detects whether or not the CIS holder 26 having the CIS 22 is in the standby position, and if the CIS holder 26 is in the standby position, the CPU 101 performs prescanning, while if the CIS holder 26 is not in the standby position, the CPU 101 rotates the conveyance motor in the reverse direction, to couple the CIS drive means 74 to the CIS drive transmission means 73 with the clutch, to move the CIS holder 26 to the standby position. In this manner, as it is detected by using the sensor (not shown) whether or not the CIS holder 26 exists in the standby position, even if the CIS holder 26 accidentally does not exist in the standby position, the CIS holder 26 can be moved to the standby position and prescanning can be performed.

At step S604, the CPU 101 moves the CIS 22 and the reference white board 25 to the reading position. More particularly, the CPU 101 rotates the conveyance motor in the normal direction, to transmit the driving force to the CIS drive means 74, and move the CIS holder 26 from the standby position to the reading position.

At step S605, the CPU 101 drives a paper feed roller 19 to feed a document to the reading start position.

At step S606 the CPU 101 operates the CIS 22 to read the document by 1 line.

At step S607, the CPU 101 determines whether or not the reading processing has been completed. If it is determined that the reading processing has been completed, the process proceeds to the next step, otherwise, returns to step S606.

At step S609, the CPU 101 moves the CIS 22 and the reference white board 25 to the standby position, and ends the reading processing.

According to the present embodiment, in an image printing/reading apparatus in which commonality of print sheet path and document path is at least partially realized as a common path, reading means for reading a document is movable between a reading position and a standby position, and particularly, the reading means performs prescanning in a position where the influence of ambient light from a discharge port is reduced (e.g., the standby position). As a result, the degradation of image due to ambient light can be reduced. Note that the standby position may be any position as long as it is in the casing of the printing/reading apparatus and away from the reading position. Further, the distance between the standby position and the reading position may be an arbitrary distance as long as the influence of ambient light from the discharge port can be reduced.

Further, according to the present embodiment, provided is an image printing/reading apparatus comprising: a printing unit to print an image on a print sheet conveyed through a print sheet path; a reading unit to read a document conveyed through a document path, having a common part belonging to the print sheet path and the document path; a reference white board for shading correction used by the reading unit upon execution of prescanning; and a moving unit to move the reading unit and the reference white board to a document reading position when the reading unit executes document reading, on the other hand, to move the reading unit and the reference white board to a retreat position, e.g. in a direction deviated from a color material discharging direction, in which the influence of printing color material is reduced at least when the printing unit executes printing; and a prescanning control unit (e.g. the CPU 101) to perform prescanning when the reading unit and the reference white board are in the retreat position.

That is, as the reference white board 25 for shading correction is retreated to at least a position where it is difficult to be soiled with ink upon image printing (e.g., the standby position), even in a case where ink is directly discharged while a print sheet is not conveyed, the reference white board 25 can be prevented from being soiled with the ink.

Further, according to the present embodiment, as the standby position of the reference white board 25 is higher than the ink head 65, even if ink is discharged upon failure of conveyance of print sheet, the reference white board 25 can be prevented from being soiled with ink. Further, the standby position may be moved by the width of ink head or greater in the same or inverse direction of the print-sheet conveyance direction. In this case, more preferable shading correction data can be obtained. This can further improve the image quality of read image, and by extension, improve the image quality of printed image.

Second Embodiment

The present embodiment is provided so as to solve the problem that when a paper jam occurs in the reading position, the document or print sheet jammed therein disturbs a prescanning operation. In the present embodiment, a detection unit to detect a jam occurred in a common path belonging to the print sheet path and the document path is provided, and if a jam is not detected, prescanning is performed in the retreat position. Note that it goes without saying that the present invention is applicable to solutions to other problems.

Figure 7:
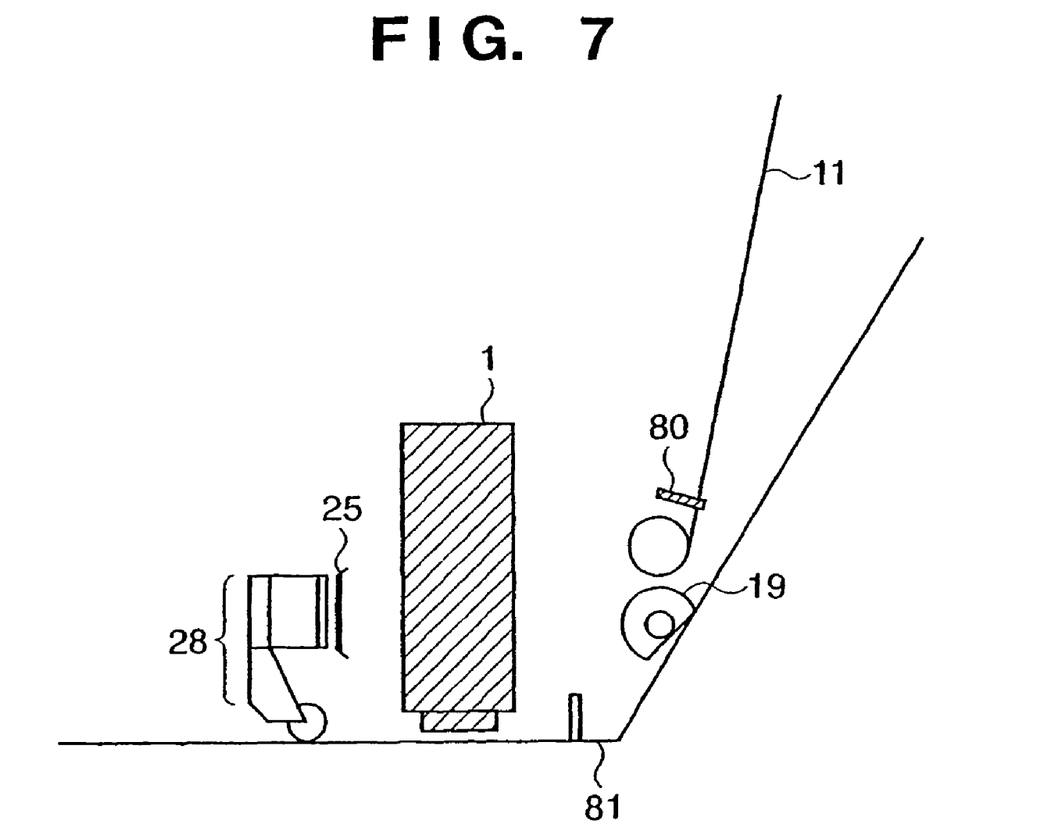
FIG. 7 is a schematic cross sectional view showing the position of a jam detection sensor according to a second embodiment of the present invention.

FIG. 7 is a schematic cross sectional view showing the position of a jam detection sensor according to the present embodiment. Reference numeral 80 denotes a DS sensor which detects a document placed on a document holder 11; and 81, a PE sensor which detects a document and a print sheet. The sensors 80 and 81 are positioned on a path where reading and printing overlap each other. Based on detection outputs from the two sensors and the position of the paper feed roller 19, the CPU 101 detects a jam.

Next, the reading processing with execution of jam detection will be described with reference to the flowchart of FIG. 6. Note that explanations of processing described in the first embodiment will be omitted.

At step S602, the CPU 101 determines whether or not a jam has occurred, i.e., whether or not paper exists in the conveyance path, based on detection information from the DS sensor 80 and detection information from the PE sensor 81 and position information of the paper feed roller 19. If a jam has occurred, the process proceeds to error processing at step S610. If a paper jam has not occurred, a prescanning operation is performed at step S603.

If the reading processing (S607) has been completed, the CPU 101 performs jam detection at step S608. If a jam has occurred, the process proceeds to the error processing at step S610. If a jam has not occurred, the CIS 22 and the reference white board 25 are moved to the standby position, and the reading processing ends.

Figure 8:
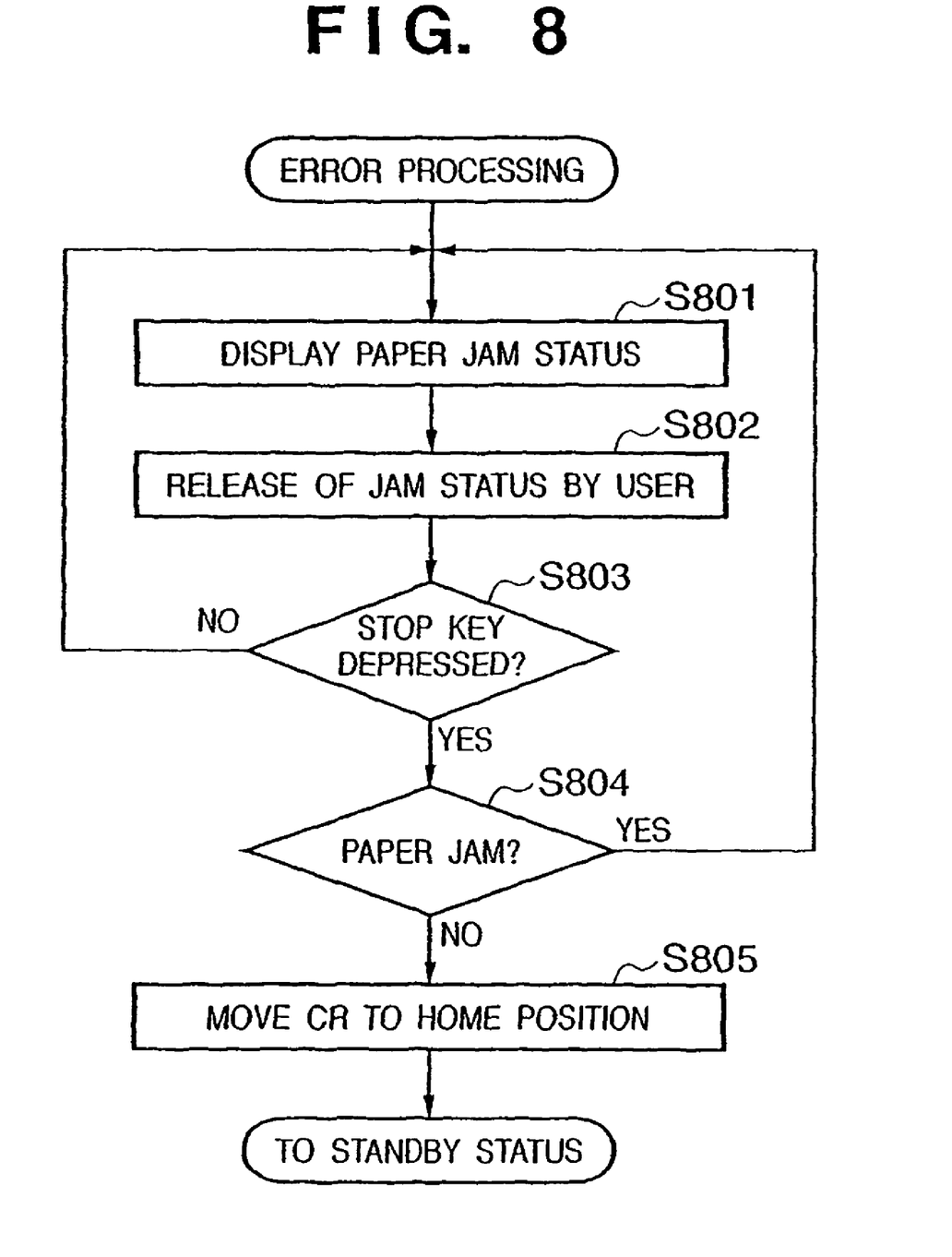
FIG. 8 is a flowchart showing jam error processing according to the second embodiment.

FIG. 8 is a flowchart showing jam error processing according to the present embodiment. The flowchart shows the details of the above-described step S610.

At step S801, the CPU 101 displays the status of occurrence of paper jam on the LCD of the operation/display unit 104. At step S802, jam release processing is performed. More particularly, the CPU 101 detects the user's depressing a jam release button. It may be arranged such that when the user has depressed the jam release button and the paper has been removed, the CIS 22 is automatically moved to the second position (standby position) by a spring attached to the shaft of the CIS holder 26. At step S803, the CPU 101 displays a message instructing to depress the stop key on the LCD of the operation/display unit 104. Then the CPU 101 detects the user's depressing the stop key. When the stop key has been depressed, paper jam detection is performed at step S804. If a paper jam has not occurred, the CPU 101 moves the cartridge to the home position at step S805, to set the apparatus in the standby status.

Note that it may be arranged such that the CPU 101 performs paper jam detection at step S803, and if a paper jam has not occurred, the CPU 101 displays a message instructing to depress the stop key on the LCD of the operation/display unit 104, then at step S804, the CPU 101 detects the user's depressing the stop key. That is, the processings at steps S803 and S804 may be interchanged.

According to the present embodiment, as prescanning is performed in the retreat position, the influence of jam can be reduced. Further, prescanning can be performed in the standby position when a jam has not been occurred.

Other Embodiments

In the above-described embodiments, as the reference white board 25 and the CIS 22 form one reading unit, the both elements move, integrally with each other, between the retreat position and the reading position. However, in the structure where the reference white board 25 can be read in the retreat position, these elements are not necessarily integrated. For example, it may be arranged such that the reference white board 25 and the CIS 22 are separately provided and independently moved. Note that in a case where these elements are integrated, the mechanism for movement can be more simple and the cost of production can be further reduced in comparison with the case where the reference white board 25 and the CIS 22 are separately provided and independently moved.

Further, it may be arranged such that prescanning is performed in any other position than the standby position (e.g., the reading position) at normal times and only upon occurrence of jam, the reading unit is moved to a position where the influence of the occurrence of jam is prevented (e.g., the standby position) and prescanning is performed there.

As described above, according to the present invention, in a so-called one-path type image printing/reading apparatus, prescanning is performed in a retreat position, thereby the apparatus can be downsized, and the influence of stray light from a print-sheet discharge port on shading data can be reduced.

The present invention can be applied to a system constituted by a plurality of devices, or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

The invention claimed is:

1. An image printing and reading apparatus comprising:
   a printing unit to print an image on a print sheet conveyed through a print sheet path;
   a reading unit to read a document conveyed through a document path, having a common part belonging to said print sheet path and said document path;
   a reference white board for shading correction used by said reading unit upon execution of prescanning; and
   a moving unit to move said reading unit to a reading unit document reading position and said reference white board to a reference white board document reading position when said reading unit executes document reading, and to move said reading unit to a reading unit retreat position and said reference white board to a reference white board retreat position in at which the influence of ambient light is reduced at least upon execution of prescanning,
   wherein the reading unit retreat position is relatively higher than the reading unit document reading position and the reference white board retreat position is relatively higher than the reference white board document reading position.

2. The apparatus according to claim 1, wherein the reading unit retreat position and the reference white board retreat position are positions within a casing of said image printing and reading apparatus.

3. The apparatus according to claim 1, further comprising a detection unit to detect occurrence of jam in the common part belonging to said print sheet path and said document path,
wherein if said detection unit has not detected the occurrence of jam, said reading unit executes the prescanning.

4. The apparatus according to claim 2, further comprising a detection unit to detect occurrence of jam in the common part belonging to said print sheet path and said document path,
wherein if said detection unit has not detected the occurrence of jam, said reading unit executes the prescanning.

5. A prescanning method in an image printing and reading apparatus including a printing unit to print an image on a print sheet conveyed through a print sheet path, a reading unit to read a document conveyed through a document path, having a common part belonging to the print sheet path and the document path, and a reference white board for shading correction used by the reading unit upon execution of prescanning, said method comprising:
a step of moving the reading unit to a reading unit document reading position and the reference white board to a reference white board document reading position when the reading unit executes document reading, and to move the reading unit to a reading unit retreat position and the reference white board to a reference white board retreat position in at which the influence of ambient light is reduced at least upon execution of prescanning; and
a step of executing the prescanning when the reading unit and the reference white board are in the retreat position,
wherein the reading unit retreat position is relatively higher than the reading unit document reading position and the reference white board retreat position is relatively higher than the reference white board document reading position.

6. The method according to claim 5, wherein the reading unit retreat position and the reference white board retreat position are positions within a casing of the image printing and reading apparatus.

7. The method according to claim 5, further comprising a step of detecting occurrence of jam in the common part belonging to the print sheet path and the document path,
wherein if the occurrence of jam has not been detected, the prescanning is executed.

8. The method according to claim 6, further comprising a step of detecting occurrence of jam in the common part belonging to the print sheet path and the document path,
wherein if the occurrence of jam has not been detected, the prescanning is executed.

* * * * *